(12) United States Patent
Vokey et al.

(10) Patent No.: US 7,292,155 B2
(45) Date of Patent: Nov. 6, 2007

(54) MOISTURE DETECTION SENSOR TAPE WITH LEAK LOCATE

(75) Inventors: David E. Vokey, Sidney (CA); Hani Nassar, Hickory, NC (US)

(73) Assignee: Detec Systems LLC, Sidney, British Columbia (CA)

( * ) Notice: Subject to any disclaimer, the term of this patent is extended or adjusted under 35 U.S.C. 154(b) by 193 days.

(21) Appl. No.: 11/229,312

(22) Filed: Sep. 19, 2005

(65) Prior Publication Data

US 2007/0046481 A1 Mar. 1, 2007

Related U.S. Application Data

(60) Provisional application No. 60/712,833, filed on Sep. 1, 2005.

(51) Int. Cl.
*G08B 21/00* (2006.01)

(52) U.S. Cl. .................. 340/602; 340/604; 340/605

(58) Field of Classification Search .......... 340/602, 340/604, 605, 596, 598; 200/61.04, 61.05, 200/61.06, 61.07, 182; 324/663
See application file for complete search history.

(56) References Cited

U.S. PATENT DOCUMENTS

| | | | | |
|---|---|---|---|---|
| 3,721,898 A | * | 3/1973 | Dragoumis et al. | 340/605 |
| 4,191,950 A | * | 3/1980 | Levin et al. | 340/604 |
| 4,386,231 A | * | 5/1983 | Vokey | 340/604 |
| 4,688,027 A | * | 8/1987 | Widener | 340/604 |
| 5,081,422 A | * | 1/1992 | Shih | 340/605 |
| 5,402,075 A | * | 3/1995 | Lu et al. | 340/602 |
| 5,808,554 A | * | 9/1998 | Shuminov | 340/604 |
| 6,144,209 A | | 11/2000 | Raymond et al. | |
| 6,175,310 B1 | | 1/2001 | Gott | |
| 6,229,229 B1 | * | 5/2001 | Sharp | 340/605 |
| 6,246,330 B1 | * | 6/2001 | Nielsen | 340/604 |
| 7,142,123 B1 | * | 11/2006 | Kates | 340/602 |
| 7,212,009 B2 | * | 5/2007 | Raymond et al. | 324/539 |

FOREIGN PATENT DOCUMENTS

WO WO 2005/010837 2/2005

* cited by examiner

*Primary Examiner*—John Tweel, Jr.
(74) *Attorney, Agent, or Firm*—Adrian D. Battison; Michael R. Williams; Ryan W. Dupuis

(57) ABSTRACT

An elongated substantially flat four-conductor moisture detection and location sensor is described. The sensor includes four parallel conductors laminated to a dielectric substrate. Two of the conductors are protected by a water pervious dielectric layer and form the water-sensing element. Two other conductors are covered by a water impervious dielectric layer and are used to loop-back one or more of the water-sensing conductors. Precise location of a water leak location is determined by connecting the four conductors to a resistance bridge. The design allows for the connection of a four-conductor cable to extend the monitoring and detection point to a convenient location without loss of location accuracy.

20 Claims, 2 Drawing Sheets

MOISTURE DETECTION SENSOR TAPE WITH LEAK LOCATE

This application claims priority under 35 U.S.C. 119 from U.S. Provisional Application Ser. No. 60/712,833 filed Sep. 1, 2005.

FIELD OF THE INVENTION

The present invention relates to an apparatus and method for the detection and location of water penetration into residential and commercial roof structures.

BACKGROUND OF THE INVENTION

Water intrusion into roof structures is a major concern. Leaking roofs cost homeowners, commercial property owners and property insurers hundreds of millions of dollars every year. Even the smallest leaks can cause expensive problems. Structural damage to metal or plywood roof decking and rafters due to rot and rust has been commonplace for decades. Black mold or toxic mold that grows in the wet roof and wall areas is known to cause severe physical problems for occupants as well as severe fiscal problems for builders and insurance companies.

Flat or low slope roofs are commonly used for commercial and multifamily building construction. While offering simplicity and limiting the building height, they are also the most difficult to seal and drain. Leaks occurring in flat or low slope roofs often appear on the inside of the building far from the point of origin.

New "green roof" systems include live plants placed in a garden-like setting on top of a roof structure. The garden roof areas help to control rainwater run-off, provide additional insulation, help reduce carbon dioxide and are aesthetically pleasing. While providing many benefits, a green roof system further complicates roof problems. A leak can be difficult to locate and can lead to the dig-up and destruction of large sections of the planted area.

There are several types of moisture detection sensors available for detecting water leaks. There are moisture detection tapes as described by Vokey et al. in Published PCT Application WO/05/10837 published Feb. 3, 2005. These detection tapes are suited for detecting water intrusion in selected areas of a building structure but are not well suited to roof applications.

In U.S. Pat. No. 6,175,310 (Gotti) issued Jan. 16, 2001 there is disclosed and arrangement which uses exposed conductors and hygroscopic material that is not suited to roof applications where metal decking and high humidity levels can cause electrical shorts and false alarms.

The tape as described by Vokey et. al. while being better suited to roof applications with both a protective covering over the conductors and no-hygroscopic components, does not provide for pinpointing the location of the water on the tape.

In U.S. Pat. No. 6,144,209 (Raymond) issued Nov. 7, 2000 there is provided an arrangement which describes a location method using a combination of specially designed insulated and detection conductors cabled together in a form helix. This design, while useful for detection and location of water on floor-like surfaces, can not be placed between the roof deck and waterproof membrane because of the large overall dimensions and the susceptibility of the cable design to crushing and shorting.

The moisture sensors may be placed directly under the waterproof membrane which is often torched-on resulting in high temperatures that the sensor must survive. None of the earlier designs address this issue.

Precise location of a resistive water fault along a pair of conductors is a problem if a connecting cable is used to join the sensing conductors to the monitoring unit. If the connecting cable conductors are of a different resistance per unit length or if the connecting cable is of an unknown length, then the measured distance to the water fault can be in error.

SUMMARY OF THE INVENTION

It is an object of the present invention to address one or more of the above issues and provide a reliable detection and location system.

According to one aspect of the present invention there is provided a moisture detection and location sensor apparatus comprising:

a substrate tape of dielectric, hydrophobic material;

two elongate, parallel, substantially flat sensing conductors secured to a top surface of the substrate tape;

a protective layer of non-hygroscopic, water pervious material secured to the top surface of the substrate tape and extending over the two sensing conductors;

at least one substantially flat loop back conductor carried on the substrate tape;

a protective layer of non-hygroscopic, water impervious material secured to the surface of the substrate tape and extending over said at least one loop back conductor; and a mounting adhesive on a bottom surface of the substrate tape.

Preferably said at least one loop back conductor is carried on the top surface of the substrate tape parallel to the sensing conductors.

Preferably, for high temperature applications, such as under torch-on roof membranes, the dielectric materials and adhesives are heat resistant and do not melt or deform during roof construction.

Preferably said at least one loop back conductor comprises two conductors that are used to loop-back one of the sensing conductors to facilitate a distance-to-fault measurement.

Preferably, when installed in a building, the two loop back conductors are jointed to one of the sensing conductors at the distal end and at the near end all four conductors are jointed to insulated copper leads.

Preferably insulated copper leads are of the same electrical resistance per unit length.

Preferably the four insulated leads are brought out to a termination box for access, monitoring, testing and locating.

Preferably there is provided as part of the apparatus a bridge circuit having four measuring arms which are each connected to a respective one of the leads such that the measurement of the distance to a water fault is accomplished by balancing the bridge and reading from the balanced bridge the distance to the fault, which includes the length of the connecting leads.

Preferably there is provided as part of the apparatus a Time Domain Reflectometry (TDR) sensing apparatus for measuring a length of the leads such that a pulse of energy is transmitted down at least one of the leads such that when that pulse reaches an impedance change along the leads at the connection thereof to the sensing conductors, part or all of the pulse energy is reflected back to the instrument and the TDR instrument measures the time it takes for the signal to travel down the leads and back from the impedance change and the TDR then converts this time to distance and displays the information as a distance reading.

Preferably the sensing conductors are designed with significantly different characteristic impedance than that of the leads so as to ensure a strong reflection from the connection therebetween.

According to a second aspect of the invention there is provided a method of detecting and locating moisture in a building structure comprising:

providing two elongate, parallel, substantially flat sensing conductors carried on a substrate of a dielectric hydrophobic material;

attaching the substrate to the building at a location where moisture is to be detected;

providing a protective layer of non-hygroscopic, water pervious material secured to the surface of the substrate and extending over the sensing conductors; and providing at least one substantially flat loop back conductor;

providing a protective layer of non-hygroscopic, water impervious material extending over said at least one loop back conductor;

connecting said at least one substantially flat loop back conductor to one of said sensing conductors at a remote end of the sensing conductors;

detecting at a sensing end of the sensing conductors a change in conductivity between the sensing conductors indicative of a moisture penetration at a position along the sensing conductors;

and, when a moisture penetration is detected, connecting said at least one substantially flat loop back conductor and said sensing conductors at the sensing end of the sensing conductors so a sensing device which uses the resistance of the sensing conductors and the at least one loop back to determine the position along the sensing conductors of the moisture penetration.

The preferred sensor is an elongate tape suitable for placement within a building structure, adjacent to the building envelope or under a roof membrane. For high temperature applications, such as under torch-on roof membranes, the dielectric materials and adhesives should be heat resistant and not melt or deform during roof construction.

As described, the two conductors that are covered by a pervious material form the water-sensing element. The remaining two conductors that are covered and insulated by a water-impervious material are used to loop-back one of the detection conductors to facilitate the distance-to-fault measurement.

During installation the two insulated conductors are jointed to one of the conductors at the distal end. At the near end all four conductors are jointed to insulated copper conductors that are preferably of the same electrical resistance per unit length. The four insulated conductors, which are typically in a two pair cable, are brought out to a termination box for easy access, monitoring, testing and locating.

The measurement of the distance to the water fault is accomplished by connecting the four conductors to the measuring arms of a bridge circuit. The bridge is then balanced and the distance to the fault, which includes the length of the connecting cable, is read.

To accurately determine the location of the water fault across the detection conductors, it is important to know the exact length of the two pair cable as the conductors. This can usually be accomplished by physically measuring the length of cable during installation or by measuring the resistance of the cable conductors by looping them back. However, there may be circumstances where neither measurement is possible. For these cases another length measurement method must be employed.

The length of lead cable to the detection and location conductors can be measured using Time Domain Reflectometry (TDR). TDR works on the same principle as radar. A pulse of energy is transmitted down a cable. When that pulse reaches an impedance change along the cable, part or all of the pulse energy is reflected back to the instrument. The TDR instrument measures the time it takes for the signal to travel down the cable and back from the location of the impedance change. The TDR then converts this time to distance and displays the information as a distance reading.

To provide this useful distance measurement function it is necessary to deliberately design the moisture detection conductors with significantly different characteristic impedance than that of the connecting cable pair. This will ensure a strong reflection and accurate distance measurement to the conductor pair/detection conductors splice point.

The characteristic impedance of a transmission line is given by:

$$Z=((R+j\omega L)/(G+j\omega C))^{1/2} \quad (1)$$

Where:

Z is the characteristic impedance in ohms $\omega$ is the frequency in radians/sec.

R is the resistance per unit length

L is the inductance per unit length

G is the conductance per unit length

C is the capacitance per unit length

A TDR pulse is of a very short duration and contains only high frequency components. This allows reduction of equation 1 to a high frequency approximation given by:

$$Z=(L/C)^{1/2} \quad (2)$$

From equation 2 it can be seen that only the inductance and/or capacitance per unit of the detection conductors need to be changed to modify the high frequency characteristic impedance.

The magnitude of the reflected pulse at an impedance discontinuity is given by the reflection coefficient:

$$R_c=(Z_l-Z_o)/(Z_l+Z_o) \quad (3)$$

Where:

$Z_o$ is the impedance of the cable pair in ohms $Z_l$ is the impedance of the detection conductors The high frequency impedance of a typical communication or data cable pair is about 100 ohms. To ensure a strong reflection at the cable pair and detection conductor splice point, the impedance of the detection conductor pair must be measurably different than that of the cable pair. From equation (3) this is accomplished by adjusting the UC ratio to achieve the desired results. The high frequency impedance of the detection conductors should be about double that of the cable pair. This will result in a reflection coefficient of ⅓ or better. Approximately ⅓ of the incident pulse will be reflected back from the cable pair and detection conductors splice point thus providing a clear signature for an accurate measurement of the cable pair length.

With the length of connecting cable accurately known, the four conductors of the moisture sensor tape can be conveniently connected to a four terminal resistance bridge instrument. The precise resistance and therefore distance to a water fault across the detection tape can then be measured.

Subtracting the known length of the connecting cable pair gives the correct distance along the detection conductors to the water fault.

BRIEF DESCRIPTION OF THE DRAWINGS

In the accompanying drawings, which illustrate an exemplary embodiment of the present invention.

DETAILED DESCRIPTION

Figure 1:
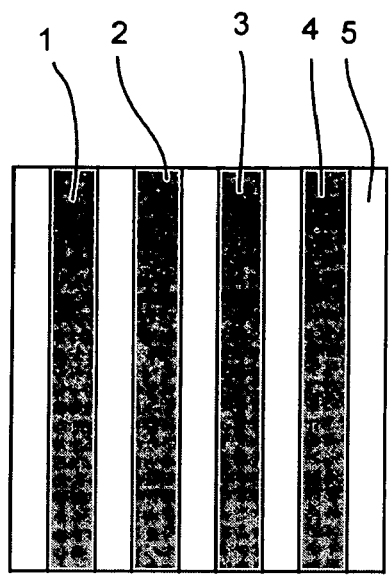
FIG. 1 is a view of the four conductors laminated to the dielectric substrate.
Figure 2:
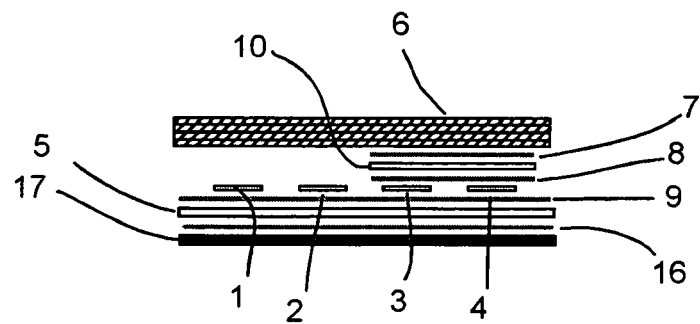
FIG. 2 is an expanded cross sectional end view of the moisture sensor design.

Referring to the accompanying drawings, and particularly FIGS. 1 and 2, there is illustrated a moisture detection tape. The tape is constructed by laminating two moisture detection copper strips 1 and 2 and two additional or loop-back copper strips 3 and 4 to a polyester substrate 6 using non-water soluble adhesive 9. An insulating layer of polyester 10 is laminated over the loop-back conductors using non-water soluble adhesive 8. A non-hygroscopic, non-woven, water pervious layer 6 is applied over the insulated loop-back conductors 3 and 4, detection conductors 1 and 2 and polyester substrate 5. A non-water soluble adhesive layer 16 that will adhere to common building materials such as wood, steel, concrete, etc. is applied to the underside of the polyester substrate 6. A 50.4 mm wide×0.1 mm thick peel off release layer 17 is applied over the underside adhesive layer 16.

The tape is constructed, in one example, by applying a non-water soluble adhesive 9 to a 50.4 mm wide×0.038 mm thick polyester substrate 5. Four 0.051 mm thick×6.35 mm wide soft bare copper strips 1, 2, 3 and 4 are laid down on the adhesive coated substrate 5 with a 5 mm edge-to-edge separation. The adhesive coating 8 is applied over the loop-back conductors 3 and 4. A 0.076 mm thick×23 mm wide polyester insulating film 10 is laid down over the loop-back conductors 3 and 4 and the adhesive layer 7 applied over the insulating film 5. The non-hygroscopic, non-woven, water pervious layer 6 is applied over all. The non-water soluble adhesive layer 16 is applied to the underside of the polyester substrate 5. The 50.4 mm wide×0.1 mm thick peel off release layer 17 is applied over the underside adhesive layer 16.

With the specified dimensions in the above detailed design the mutual capacitance between the detection conductors 1 and 2 is about 27 pF/m and the mutual inductance is about 1.5 □H/m. From Equation 2, this results in a high frequency impedance of approximately 240 ohms that is at least twice that of a standard data or communication pair. From Equation 3, this results in reflection coefficient of ⅓ or better thus ensuring an accurate connecting cable locate using time domain reflectometry.

During installation in a location to be monitored, the two loop-back conductors 3 and 4 at the distal end are connected directly to one conductor 2 of the moisture detection conductors 1 and 2 by soldering a jumper wire 22 to the conductors 2, 3 and 4, or other suitable means. At the near end, the moisture detection conductors 1 and 2 are connected by means of a connecting cable 19 to a sensor device 32, as shown in FIG. 6.

During operation, the sensor device is arranged to emit a signal when moisture causes a resistive path between the moisture detection conductors 1 and 2, that is current above a threshold value flows between the conductors 1 and 2.

Figure 3:
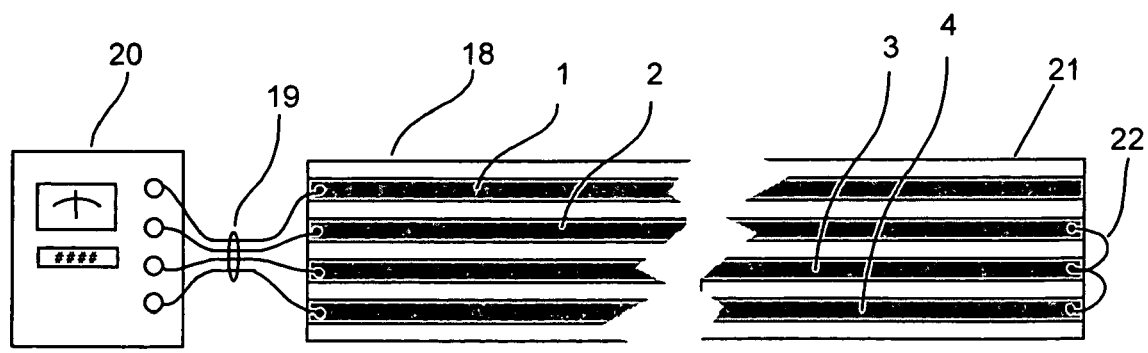
FIG. 3 is a view of the MDT connected to an electrical bridge for water fault locating.

As a second step in the operation, as shown in FIG. 3, the distance to a wet resistive fault is calculated by connecting a suitable four-terminal bridge 20 to the near end of the connecting leads 19. The bridge is then balanced and the total distance to the fault location is read. The length of connecting lead 19 is subtracted from the total measured length to determine the distance along the detection conductors to the fault location.

Figure 6:
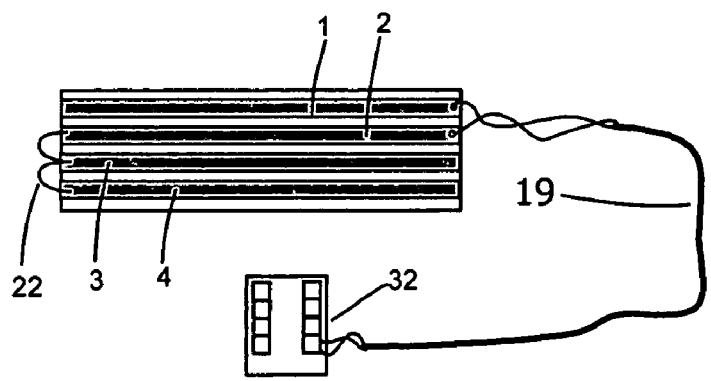
FIG. 6 is an illustration of the moisture detection conductors connected to a sensor unit.

As shown in FIG. 3, the leads to the four conductors are provided by 4-wire cable 19, part of which provides the two leads in FIG. 6. Thus during normal operation for sensing the presence of a moisture penetration, only the two leads from the sensing conductors 1 and 2 are used.

When a penetration is detected, the bridge as a separate measuring instrument is brought up to the sensing end of the conductors and connected to the four available leads so that the location of the fault can be calculated.

Figure 4:
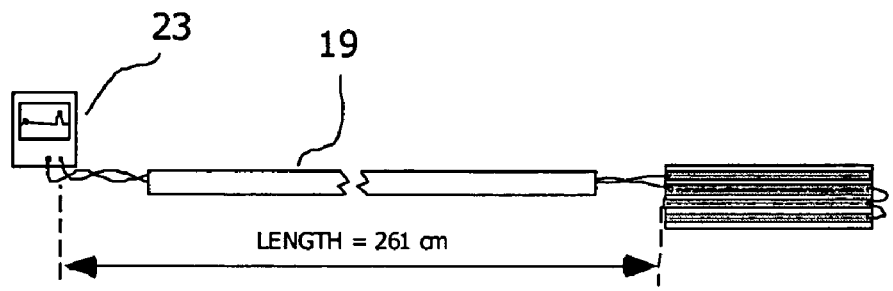
FIG. 4 is an illustration of the use of a TDR to measure the length of the connecting cable.
Figure 5:
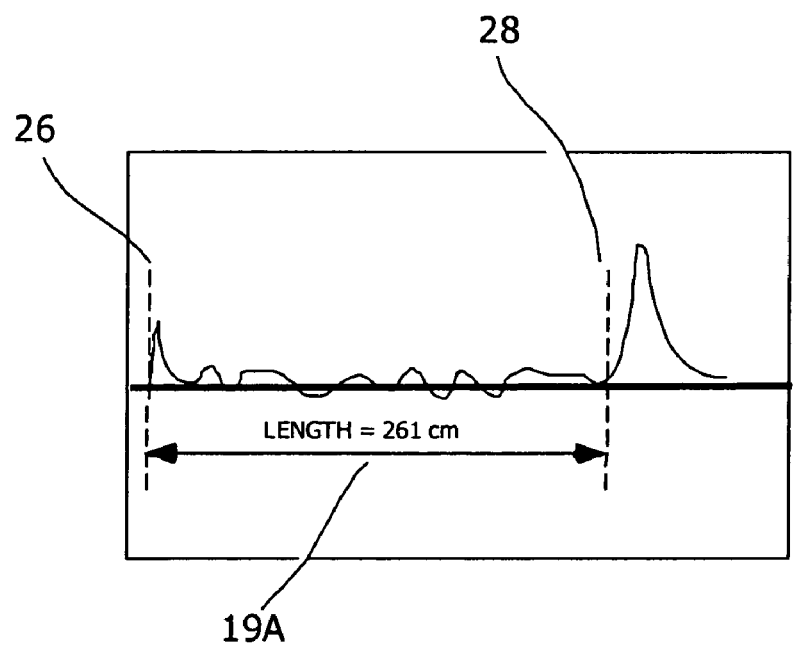
FIG. 5 is an illustration of a TDR display.

If the length of the connecting leads 19 is unknown then a TDR instrument 23 is used, as shown in FIGS. 4 and 5, to determine the length 19A of the connecting cable 19 by measuring the time-of-flight and therefore distance from the incident pulse 26 to the reflected pulse 28. Thus, if required the bridge is disconnected and the TDR instrument connected into place to the leads 19 to the sensing conductors to make the necessary measurement.

In an alternate construction (not shown), the loop back conductors 3 and 4 are laminated to the underside of the dielectric substrate 5. A second dielectric substrate is then applied under the loop-back conductors 3 and 4 with the adhesive layer 16 and release layer 17 applied under the second dielectric layer.

In another alternate method for detecting the location of the fault after a signal has been detected from the conductors 1 and 2, a tape having a single loop back conductor 3 can be used, in replacement for the tape having the two loop back conductors 3 and 4 of FIG. 1. In this arrangement, the single loop back conductor 3 is arranged to loop-back one of the detection conductors 1 or 2. In this case a calculation can be carried out but the length and resistance per unit length of the loop back conductor 3 must be known and the length of the loop back conductor accounted for in the distance calculation. Thus the total distance that the bridge will read is the distance to the fault on the detection conductor, the distance from the fault to the end of the conductor and the distance back along the loop-back conductor. Therefore the calculation must factor in that the total conductor length measured is twice that of the detection conductor alone and if the loop back conductor resistance per unit length is different than that of the detection conductor then there will be an error in the result.

All insulating, water pervious materials and adhesives are selected to withstand roof membrane application temperatures of 200° C. or greater for periods of several minutes or longer.

Since various modifications can be made in my invention as herein above described, and many apparently widely different embodiments of same made within the spirit and scope of the claims without department from such spirit and

The invention claimed is:

1. A moisture detection and location sensor apparatus comprising:
   a substrate tape of dielectric, hydrophobic material;
   two elongate, parallel, substantially flat sensing conductors secured to a top surface of the substrate tape;
   a protective layer of non-hygroscopic, water pervious material secured to the top surface of the substrate tape and extending over the two sensing conductors;
   at least one substantially flat additional conductor carried on the substrate tape;
   a protective layer of non-hygroscopic, water impervious material secured to the surface of the substrate tape and extending over said at least one additional conductor; and
   a mounting adhesive on a bottom surface of the substrate tape.

2. The apparatus according to claim 1 wherein said at least one additional conductor is carried on the top surface of the substrate tape parallel to the sensing conductors.

3. The apparatus according to claim 1 wherein, for high temperature applications, the dielectric materials and adhesives are heat resistant and do not melt or deform during roof construction.

4. The apparatus according to claim 1 wherein said at least one additional conductor comprises two conductors each of which is covered by the protective layer of non-hygrosconic, water impervious material secured to the surface of the substrate tape.

5. The apparatus according to claim 4 wherein, when installed in a building, the two additional conductors are jointed to one of the sensing conductors at the distal end and at the near end all four conductors are jointed to insulated copper leads.

6. The apparatus according to claim 5 wherein insulated copper leads are of the same electrical resistance per unit length.

7. The apparatus according to claim 5 wherein the four insulated leads are brought out to a termination box for access, monitoring, testing and locating.

8. The apparatus according to claim 1 including a bridge circuit having four measuring arms which are each connected to a respective one of the leads such that the measurement of the distance to a water fault is accomplished by balancing the bridge and reading from the balanced bridge the distance to the fault, which includes the length of the connecting leads.

9. The apparatus according to claim 5 including a Time Domain Reflectometry (TDR) sensing apparatus for measuring a length of the leads such that a pulse of energy is transmitted down at least one of the leads such that when that pulse reaches an impedance change along the leads at the connection thereof to the sensing conductors, part or all of the pulse energy is reflected back to the instrument and the TDR instrument measures the time it takes for the signal to travel down the leads and back from the impedance change and the TDR then converts this time to distance and displays the information as a distance reading.

10. The apparatus according to claim 9 wherein the sensing conductors are designed with significantly different characteristic impedance than that of the leads so as to ensure a strong reflection from the connection therebetween.

11. A method of detecting and locating moisture in a building structure comprising:
    providing two elongate, parallel, substantially flat sensing conductors carried on a substrate of a dielectric hydrophobic material;
    attaching the substrate to the building at a location where moisture is to be detected;
    providing a protective layer of non-hygroscopic, water pervious material secured to the surface of the substrate and extending over the sensing conductors; and
    providing at least one substantially flat additional conductor;
    providing a protective layer of non-hygroscopic, water impervious material extending over said at least one additional conductor;
    connecting said at least one substantially flat additional conductor to one of said sensing conductors at a remote end of the sensing conductors;
    detecting at a sensing end of the sensing conductors a change in conductivity between the sensing conductors indicative of a moisture penetration at a position along the sensing conductors;
    and, when a moisture penetration is detected, connecting said at least one substantially flat additional conductor and said sensing conductors at the sensing end of the sensing conductors so a sensing device which uses the resistance of the sensing conductors and the at least one additional conductor to determine the position along the sensing conductors of the moisture penetration.

12. The method according to claim 11 said at least one additional conductor comprises two conductors each connected to one of the sensing conductors at the remote end.

13. The method according to claim 12 wherein the measurement of the distance to the location of the moisture penetration is accomplished by connecting the two sensing conductors and the two additional conductors to measuring arms of a bridge circuit by four leads and the bridge is then balanced and the distance to the location, which includes the length of leads, is read.

14. The method according to claim 11 wherein the sensing conductors and the at least one additional conductor are carried on an elongate tape substrate which is placed within a building structure, adjacent to the building envelope or under a roof membrane.

15. The method according to claim 14 wherein there is provided a protective layer of non-hygroscopic, water impervious material secured to the to surface of the substrate tape and extending over said at least one additional conductor; and a mounting adhesive on a bottom surface of the substrate.

16. The method according to claim 15 wherein, for high temperature applications, the dielectric materials and adhesives are heat resistant and do not melt or deform during roof construction.

17. The method according to claim 13 wherein the leads are of the same electrical resistance per unit length.

18. The method according to claim 13 wherein the leads are brought out to a termination box for easy access, monitoring, testing and locating.

19. The method according to claim 13 wherein the length of the leads to the sensing conductors and said at least one additional conductor is measured using Time Domain Reflectometry (TDR) wherein a pulse of energy is transmitted down the leads such that when that pulse reaches an impedance change along the leads at the connection to the conductors, part or all of the pulse energy is reflected back to the instrument and the TDR instrument measures the time it takes for the signal to travel down the cable and back from the location of the impedance change and the TDR then converts this time to distance and displays the information as a distance reading.

20. The method according to claim 19 wherein the sensing conductors are designed with significantly different characteristic impedance than that of the leads so as to ensure a strong reflection.

* * * * *